(12) United States Patent
Cho (10) Patent No.: US 11,014,034 B2
(45) Date of Patent: May 25, 2021

(54) DUST REMOVING DEVICE FOR LONG BAG FILTER HAVING LARGE DIAMETER

(71) Applicant: Kwang Sup Cho, Gyeonggi-do (KR)

(72) Inventor: Kwang Sup Cho, Gyeonggi-do (KR)

( * ) Notice: Subject to any disclaimer, the term of this patent is extended or adjusted under 35 U.S.C. 154(b) by 18 days.

(21) Appl. No.: 16/485,395

(22) PCT Filed: Feb. 7, 2018

(86) PCT No.: PCT/KR2018/001632
§ 371 (c)(1),
(2) Date: Aug. 12, 2019

(87) PCT Pub. No.: WO2018/155847
PCT Pub. Date: Aug. 30, 2018

(65) Prior Publication Data
US 2019/0358573 A1 Nov. 28, 2019

(30) Foreign Application Priority Data
Feb. 22, 2017 (KR) .................. 10-2017-0023439

(51) Int. Cl.
*B01D 46/00* (2006.01)
*B01D 46/04* (2006.01)
*B01D 46/02* (2006.01)

(52) U.S. Cl.
CPC ............ *B01D 46/04* (2013.01); *B01D 46/023* (2013.01)

(58) Field of Classification Search
CPC .................. B05B 1/14; B01D 46/00; B01D 46/0057–0083; B01D 46/04; B01D 46/023

USPC ............................ 95/278–282; 55/282–305; 239/398–434.5
See application file for complete search history.

(56) References Cited

U.S. PATENT DOCUMENTS

| | | | | |
|---|---|---|---|---|
| 3,972,523 A | * | 8/1976 | Brandes | B65H 29/686 271/183 |
| 4,356,010 A | * | 10/1982 | Meyer zu Riemsloh | B01D 46/04 55/302 |
| 4,367,080 A | * | 1/1983 | Kordas | B01D 46/04 55/302 |
| 6,604,694 B1 | * | 8/2003 | Kordas | B01D 46/0068 239/398 |
| 2012/0024408 A1 | * | 2/2012 | Jung | B01D 46/42 137/833 |

FOREIGN PATENT DOCUMENTS

| | | |
|---|---|---|
| KR | 100803721 | 2/2008 |
| KR | 20090102977 | 10/2009 |
| KR | 20110122926 | 11/2011 |
| KR | 1020110107213 | 4/2012 |
| KR | 20120083258 | 7/2012 |
| KR | 20120140336 | 12/2012 |
| KR | 20130000722 | 1/2013 |
| WO | WO2000024496 | 5/2000 |

* cited by examiner

*Primary Examiner* — T. Bennett Mckenzie
(74) *Attorney, Agent, or Firm* — IPLA P.A.

(57) ABSTRACT

A dust removing device for a long bag filter having a large diameter employs a method of injecting amplified air through a dual injector having two injectors vertically arranged on the same axis to exhibit a stronger dust removing force than a conventional bag filter dust removing device, and is thus applicable to a bag filter having relatively a large diameter and a long length.

10 Claims, 5 Drawing Sheets

DUST REMOVING DEVICE FOR LONG BAG FILTER HAVING LARGE DIAMETER

BACKGROUND

The present invention relates to a dust removing device for a long bag filter having a large diameter. The dust removing device employs a method of injecting amplified air through a dual injector having two injectors vertically arranged on the same axis to exhibit a stronger dust removing force than a conventional bag filter dust removing device, and is thus applicable to a bag filter having relatively larger diameter and longer length.

This application is based on and claims priority from Korean Patent Application No. 10-2017-0023439 filed on Feb. 22, 2017 in the Korean Intellectual Property Office, the disclosure of which is incorporated herein in its entirety by reference.

Figure 1:
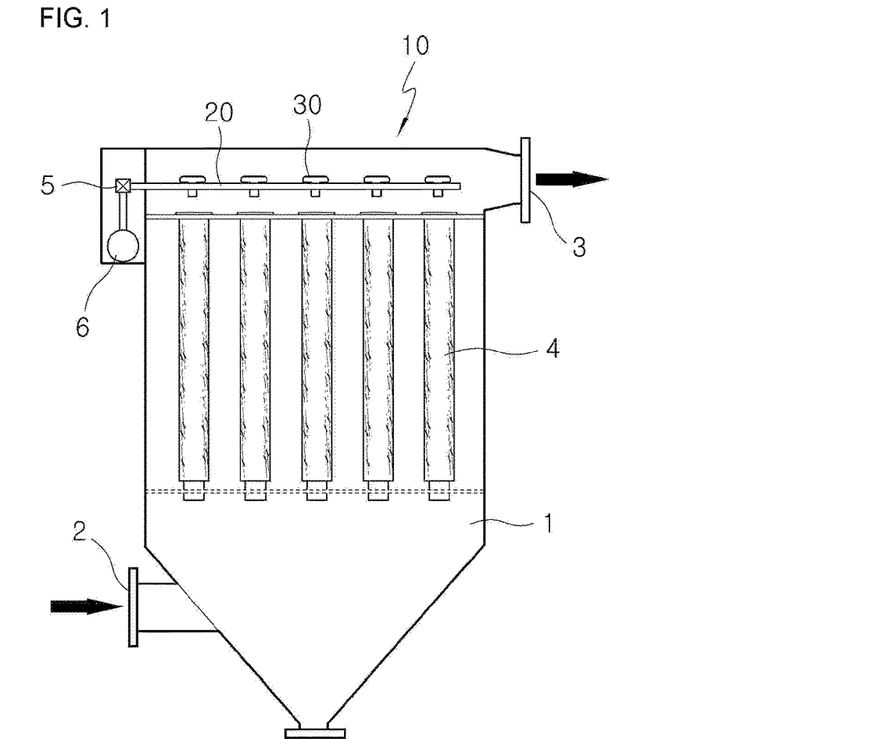
FIG. 1 is a longitudinally sectional view of a dust collector to which a conventional bag filter dust removing device is applied.

In various industrial sites, such as factories for manufacturing cement and textile, chemical plants, and others, an industrial dust collector 10 for inhaling generated dust and various foreign matters through an intake port 2, filtering them through a plurality of bag filters 4 mounted inside a dust chamber 1, and discharging clean air, from which dust and foreign matters are removed, to the outside through an exhaust port 3 has been used (See FIG. 1).

Because a pressure loss increases if a dust layer collected on the surface of the bag filter 4 is inordinately thick, dust removing work for periodically removing dust after using the bag filter to some degree.

A filter dust removing method which has been widely used adopts an air pulse jet type, which jets strong compressed air to the bag filter 4 at appropriate time intervals, induces the directly jet compressed air and amplified air involved around the bag filter by high speed jet into the bag filter 4 at a very short moment, and expands and vibrates the bag filter 4 in order to remove dust attached on the outer surface of the bag filter 4.

As a conventional art using such a dust removing method, Korean Patent Publication No. 2001-0033657 (published on Apr. 25, 2001) discloses a 'Coanda injector and compressed gas line for connecting the Coanda injector'.

The conventional art uses an injector for maximizing Coanda effect, and includes an inlet for a medium to be inhaled, at least one inlet for a pressurized medium which can be supplied through a compressed gas line, a spare chamber having a nozzle slot which is preferably formed in a ring shape, and an outlet for the medium to be inhaled and the pressurized medium.

Moreover, Korean Patent Publication No. 10-2009-0102977 (published on Oct. 1, 2009) discloses a pulse jet type air injection device for bag filters of dust collector, which includes an injection device mounted above a supply tube to inject air to a dust collecting filter so that the air can be jet to the dust collecting filter located below the injection device while flowing along the outer circumferential surface of the supply tube.

In the meantime, the conventional dust collector generally uses a bag filter which is generally less than 5 m in length and less than 2.45 m² in filtering area, but occupies a wide area in a factory in order to satisfy a required dust collecting capacity. Therefore, in order to reduce an installation area of the dust collector and optimize space efficiency, a long bag filter with a large diameter, which is more than 10 m in length and more than 4.9 m² in filtering area is applied.

However, the conventional bag filter dust removing devices have several disadvantages in that it is difficult to be applied to a bag filter with a large diameter since they are to be applied to general bag filters which are less than 5 m in length, and in that it is inadequate to be applied to a long bag filter since an arrival range of air pulse injected for removing dust is short.

REFERENCE PUBLICATIONS

Korean Patent Publication No. 2001-0033657 (published on Apr. 25, 2001)

Korean Patent No. 10-0803721 (published on Feb. 16, 2008)

Korean Patent Publication No. 10-2009-0102977 (published on Oct. 1, 2009)

SUMMARY OF THE INVENTION

Accordingly, the present invention has been made in view of the above-mentioned problems occurring in the prior art, and it is an object of the present invention to provide a dust removing device for a long bag filter having a large diameter, which employs a method of injecting amplified air through a dual injector having two injectors with different diameters vertically arranged on the same axis and spaced apart from each other at a predetermined interval to enhance quantity, pressure, arrival distance, and so on of the amplified air, thereby being applicable to a bag filter having relatively larger diameter and longer length.

To accomplish the above object, according to the present invention, there is provided a dust removing device for a long bag filter having a large diameter, which injects amplified air from an upper portion of a bag filter arranged inside a dust collector to remove dust collected on the bag filter, the dust removing device including: a compressed air pipe arranged horizontally and having a plurality of outlets formed to be spaced apart from each other to discharge compressed air; a first injector for amplifying the compressed air received from the compressed air pipe to inject the amplified air to the bag filter; and a second injector arranged above the first injector on the same axis to be spaced apart from the first injector and amplifying the compressed air received from the compressed air pipe to inject the amplified air into the center of the first injector, wherein the first and second injectors include: doughnut-shaped body parts having holes in the middle thereof; connection holes formed in the upper surface or the lower surface of the body parts to receive the compressed air into the body parts and connected with the outlets; injection slits formed between first guides and second guides formed in a circular shape along the inner circumferential surface of the body parts to inject the compressed air received through the connection holes, wherein each of the first guides is formed at an upper side and each of the second guides is formed at a lower side; cylindrical induction pipes downwardly extending from the second guides to inject the amplified air containing ambient air vertically downwards when the compressed air is injected through the injection slits; and curved Coanda faces formed between the second guides and the induction pipes.

Moreover, the diameters of the induction pipes of the first and second injectors are formed at a ratio of 1:0.3 to 0.7.

Furthermore, the compressed air pipe is arranged between the body part of the first injector and the body part of the second injector, the outlets are formed in the upper surface and the lower surface of the compressed air pipe, the outlet formed in the upper surface is connected with the connection hole formed in the lower surface of the body part of the second injector, and the outlet formed in the lower surface is connected with the connection hole formed in the upper surface of the body part of the first injector.

According to an embodiment of the present invention, one end of the compressed air pipe is connected to a control valve for supplying and blocking compressed air from a compressed air supply source to the compressed air pipe, and the compressed air pipe diverges into two branch pipes arranged horizontally side by side to be spaced apart from each other, and the induction pipe of the second injector is arranged between the branch pipes.

According to another embodiment of the present invention, the compressed air pipe includes a first compressed air pipe and a second compressed air pipe, the outlets are formed in the upper surfaces of the first and second compressed air pipes, and the outlets of the first and second compressed air pipes are connected with the connection holes formed in the lower surfaces of the body parts of the first and second injectors.

In this instance, the compressed air pipe is connected to the control valve for supplying and blocking the compressed air from the compressed air supply source to the compressed air pipe, and diverges into a first compressed air pipe and a second compressed air pipe.

Moreover, an end of the first compressed air pipe and an end of the second compressed air pipe are respectively connected to a first control valve and a second control valve for supplying and blocking the compressed air from the compressed air supply source to the first and second compressed air pipes, and the first and second compressed air pipes diverge into two branch pipes, which are arranged horizontally side by side to be spaced apart from each other, and the induction pipes of the first and second injectors are arranged between the branch pipes of the first and second compressed air pipes.

In this instance, the first and second control valves are turned on and off independently or simultaneously.

Furthermore, one or both of the induction pipes of the first and second injectors includes a spiral vortex forming part disposed on the inner wall thereof and having a groove or a protrusion so that the amplified air can form a vortex when passing through the induction pipe.

Additionally, a plurality of compressed air inducing parts having grooves or protrusions formed on the surface of the second guide opposite to the first guide or formed from the surface of the second guide opposite to the first guide to the Coanda face are formed in the direction of the central portion of the body part from the second guide.

As described above, the dust removing device for a long bag filter having a large diameter according to the present invention employs the dual injector structure that the second injector for injecting amplified air into a first injector is arranged above the first injector for injecting amplified air on the same axis and is spaced apart from the first injector so as to make the scope of injected air pulse wide and uniform and remarkably enhance an arrival distance, thereby showing a stronger dust removing force by being applied to the bag filter having relatively larger diameter and longer length.

Moreover, the dust removing device for a long bag filter having a large diameter according to the present invention can optimize space efficiency and reduce installation costs by reducing an installation area of the dust collector since reducing the number of the back filters in a dust collector with the same capacity due to the long bag filter with the large diameter.

DETAILED DESCRIPTION OF THE INVENTION

Hereinafter, preferred embodiments of the present invention will be described in detail with reference to the accompanying drawings. However, such embodiments of the present invention are to describe the present invention in detail such that those skilled in the art can implement the present invention easily, and the technical idea and scope of the present invention are not limited to the embodiments described herein. In addition, parts irrelevant to description are omitted in the drawings in order to clearly explain embodiments of the present invention. Similar parts are denoted by similar reference numerals throughout this specification.

Figure 2:
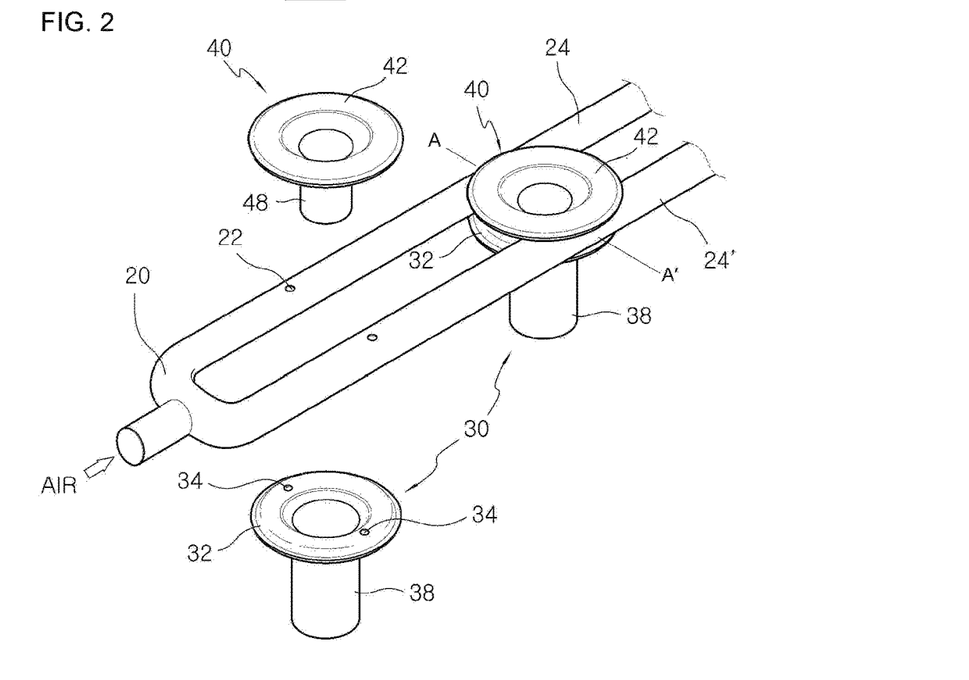
FIG. 2 is an exploded perspective view of a bag filter dust removing device according to a preferred embodiment of the present invention.
Figure 3:
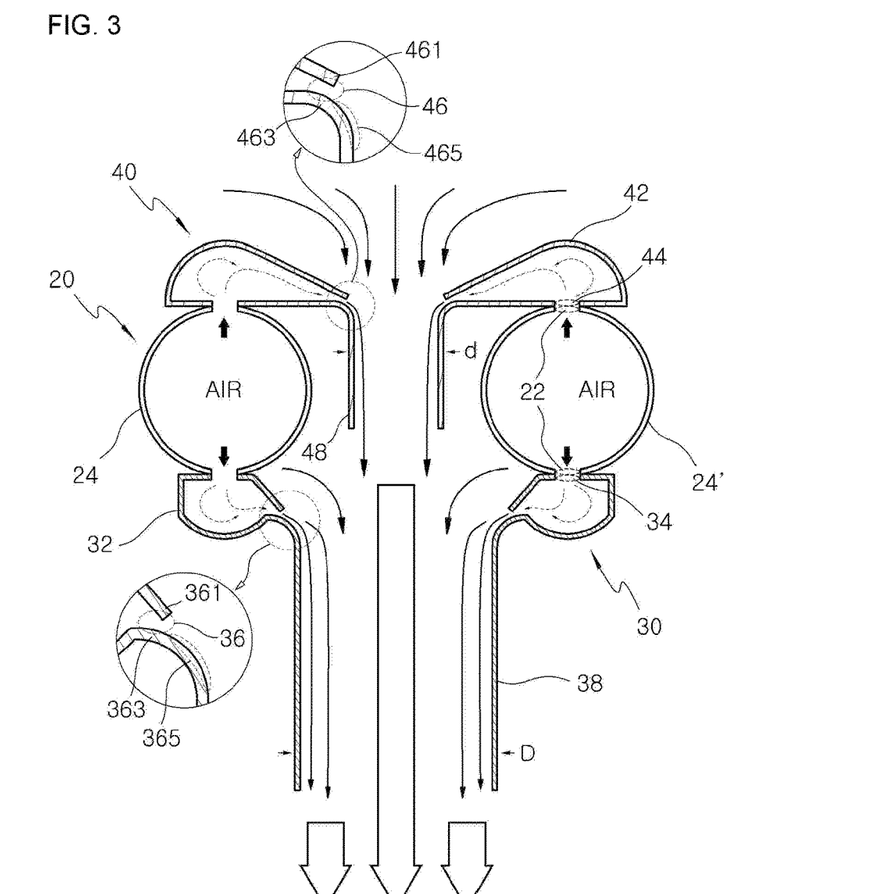
FIG. 3 is a sectional view taken along the line of A-A' of FIG. 2.

FIG. 2 is an exploded perspective view of a bag filter dust removing device according to a preferred embodiment of the present invention, and FIG. 3 is a sectional view taken along the line of A-A' of FIG. 2.

The present invention relates to a bag filter dust removing device for removing dust collected on a bag filter 4 by injecting air amplified in a moment from the top of the bag filter 4 arranged inside a dust collector 10. The bag filter dust removing device includes a compressed air pipe 20, and a first injector 30 and a second injector 40 for receiving compressed air from the compressed air pipe 20 and amplifying and injecting the received compressed air.

The compressed air pipe 20 arranged horizontally serves as a pipeline of air to supply compressed air from a compressed air supply source 6 to the first injector 30 and the second injector 40. One end of the compressed air pipe 20 is connected to a control valve 5 for supplying and blocking compressed air and the other end is closed.

A cross section which is perpendicular to a longitudinal direction of the compressed air pipe 20 may be a round shape, an oval shape, a rectangular shape or one of polygonal shapes.

The compressed air pipe 20 has a plurality of outlets 22 for jetting compressed air which are formed in any one among the upper surface and the lower surface or both of the upper surface and the lower surface to be spaced apart from each other at a predetermined interval.

The first injector 30 serves to amplify the compressed air received from the compressed air pipe 20 and inject the amplified air to the bag filter 4, and the second injector 40 is arranged above the first injector 30 on the same axis to be spaced apart from the first injector 30 and serves to amplify the compressed air received from the compressed air pipe 20 and inject the amplified air into the center of the first injector 30.

In detail, the first and second injectors 30 and 40 include: doughnut-shaped or ring-shaped body parts 32 and 42 having holes in the middle thereof; connection holes 34 and 44 formed in the upper surface or the lower surface of the body parts 32 and 42 to receive the compressed air from the compressed air pipe 20 into the body parts 32 and 42 and connected with the outlets 22; injection slits 36 and 46 formed between first guides 361 and 461 and second guides 363 and 463 formed in a circular shape along the inner circumferential surface of the body parts 32 and 42 to inject the compressed air received through the connection holes 34 and 44, wherein each of the first guides 361 and 461 is formed at an upper side and each of the second guides 363 and 463 is formed at a lower side; cylindrical induction pipes 38 and 48 vertically extending from the second guides 363 and 463 to inject the amplified air containing ambient air vertically downwards when the compressed air is injected through the injection slits 36 and 46; and curved Coanda faces 365 and 465 formed between the second guides 363 and 463 and the induction pipes 38 and 48.

As shown in FIG. 3, the injection slits 36 and 46 are spaces formed between the first guides 361 and 461 formed at the upper side and the second guides 363 and 463 formed at the lower side in a circle along the inner circumferential surface of the body parts 32 and 42. An injection angle of the compressed air injected through the injection slits 36 and 46 can be adjusted when shapes of the first guides 361 and 461 and the second guides 363 and 463 are adjusted.

The induction pipes 38 and 48 extend downwardly from the second guides 363 and 463 to be formed integrally, and the curved Coanda faces 365 and 465 are formed between the second guides 363 and 463 and the induction pipes 38 and 48.

The Coanda effect means the physical phenomenon that a fluid discharged adjacent to the surface of an object flows rapidly in a state where it is attached to the surface of the object so that a low pressure distribution is formed around the object.

That is, in case that a fluid is injected through a slit, if there is a curved surface adjacent to the injected fluid in an injection direction, the fluid is curved along the curved surface and flows rapidly.

When the compressed air is injected through the injection slits 36 and 46 formed between the first guides 361 and 461 and the second guides 363 and 463, the injected compressed air flows rapidly in the downward direction of the cylindrical induction pipes 38 and 48 along the Coanda faces 365 and 465, which is the curved surfaces formed between the second guides 363 and 463 and the induction pipes 38 and 48. In this instance, ambient air induced by the injected compressed air is involved in the injected compressed air, and amplified air which is dozens of times the first injected compressed air is injected into the bag filter 4 through the induction pipes 38 and 48 at a short moment and expands and vibrates the bag filter 4 to remove dust attached on the outer surface.

In the meantime, in order to show a sufficient dust removing force to a long bag filter with a large diameter, the size of the injector, namely, the diameter of the injector, must be increased. However, in consideration of an arrangement interval of the bag filters inside the dust collector, it is so limited to increase the size (diameter) of the injector.

Furthermore, if the diameter of the Coanda injector which injects the amplified air at high speed along the inner wall surface of the induction pipe is increased, since the amplified air flowing in the middle part of the induction pipe is weaker in pressure and smaller in volume than the amplified air injected along the inner wall surface of the induction pipe, the arrival distance is short, so it is difficult to expect sufficient dust removing force in the long bag filter.

In order to solve the above-mentioned problem, the present invention adopts a method of injecting amplified air through dual injectors vertically arranged on the same axis to be spaced apart from each other at a predetermined interval, namely, through the first injector 30 and the second injector 40, thereby raising the dust removing force through combination and compensation of the two injectors.

That is, the diameter of the first injector 30 is increased to properly cope with the long bag filter with the large diameter, and the second injector 40 located above the first injector 30 on the same axis to be spaced apart from each other injects amplified air into the center of the first injector 30, namely, into the induction pipe 38 in order to compensate the phenomenon that the amplified air passing through the center of the induction pipe 38 becomes weaker in pressure and smaller in volume due to an increase of the diameter of the first injector 30. Finally, the amplified air injected through a lower part of the induction pipe 38 of the first injector 30 is distributed uniformly and volume and pressure of the amplified air are increased so as to show strong air pulse effect to a far distance.

In this instance, a diameter (d) of the induction pipe 48 of the second injector 40 is smaller than a diameter (D) of the induction pipe 38 of the first injector 30. It is preferable that the diameters D and d of the induction pipes 38 and 48 of the first and second injectors 30 and 40 be formed at a ratio of 1:0.3 to 0.7.

If the rate of the diameter (d) of the induction pipe 48 of the second injector 40 to the diameter (D) of the induction pipe 38 of the first injector 30 is less than 0.3, since a cross sectional area and an air volume of the amplified air injected into the center of the first injector 30 from the second injector 40 get smaller, the amplified air finally injected through the lower portion of the induction pipe 38 of the first injector 30 is not distributed uniformly. If the rate of the diameter (d) of the induction pipe 48 of the second injector 40 exceeds 0.7, since an injection force of the central portion of the amplified air finally injected through the lower portion of the induction pipe 38 of the first injector 30 becomes weaker, it is difficult to expect increasing effect through combination and compensation of the first injector 30 and the second injector 40, namely, strong air pulse effect.

Additionally, it is preferable that the diameter of the bag filter 4 and the diameter (D) of the induction pipe 38 of the first injector 30 be formed at a ratio of 1:0.5 to 0.7.

As shown in FIGS. 2, 3, 4(A) and 7(C), according to the preferred embodiment of the present invention, the compressed air pipe 20 is arranged between the body part 32 of the first injector 30 and the body part 42 of the second injector 40. In this instance, the outlets 22 are formed in the upper surface and the lower surface of the compressed air pipe 20, and the outlet 22 formed in the upper surface is connected with the connection hole 44 formed in the lower surface of the body part 42 of the second injector 40, and the outlet 22 formed in the lower surface is connected with the connection hole 34 formed in the upper surface of the body part 32 of the first injector 30.

Figure 4:
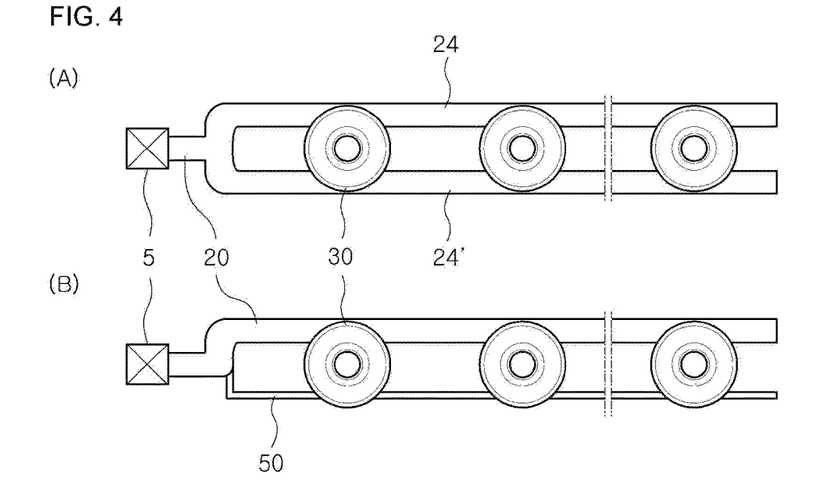
FIG. 4 is a plan view illustrating a structure of the bag filter dust removing device according to the preferred embodiment of the present invention.

For your convenience' sake, FIGS. 2, 3 and 4(C) illustrate that the compressed air pipe 20 diverges into two branch pipes 24 and 24' horizontally arranged side by side to be spaced apart from each other, and the induction pipe 48 of the second injector 40 is arranged between the branch pipes 24 and 24'.

Figure 5:
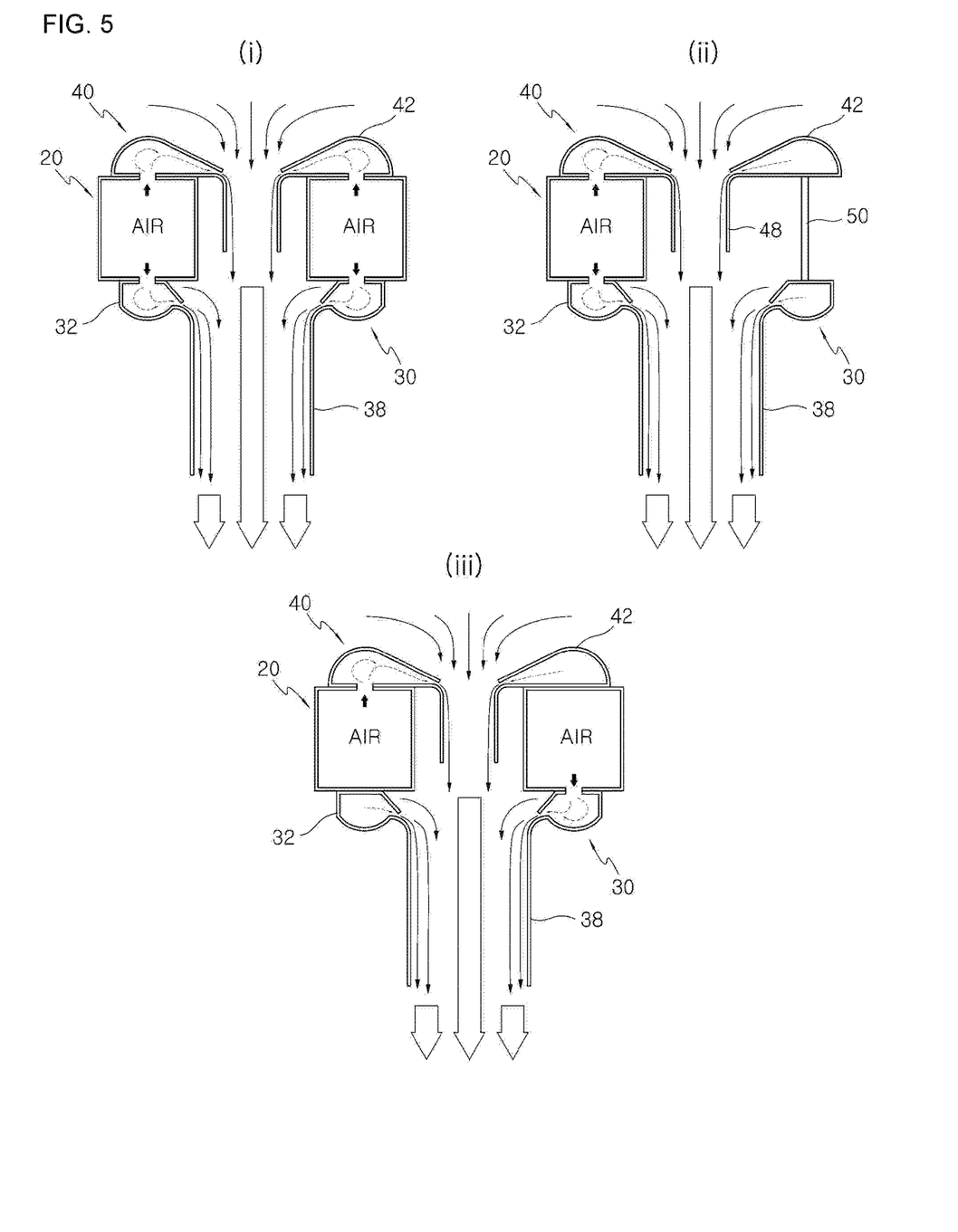
FIGS. 5 and 6 are sectional views of bag filter dust removing devices according to several preferred embodiments of the present invention.
Figure 6:
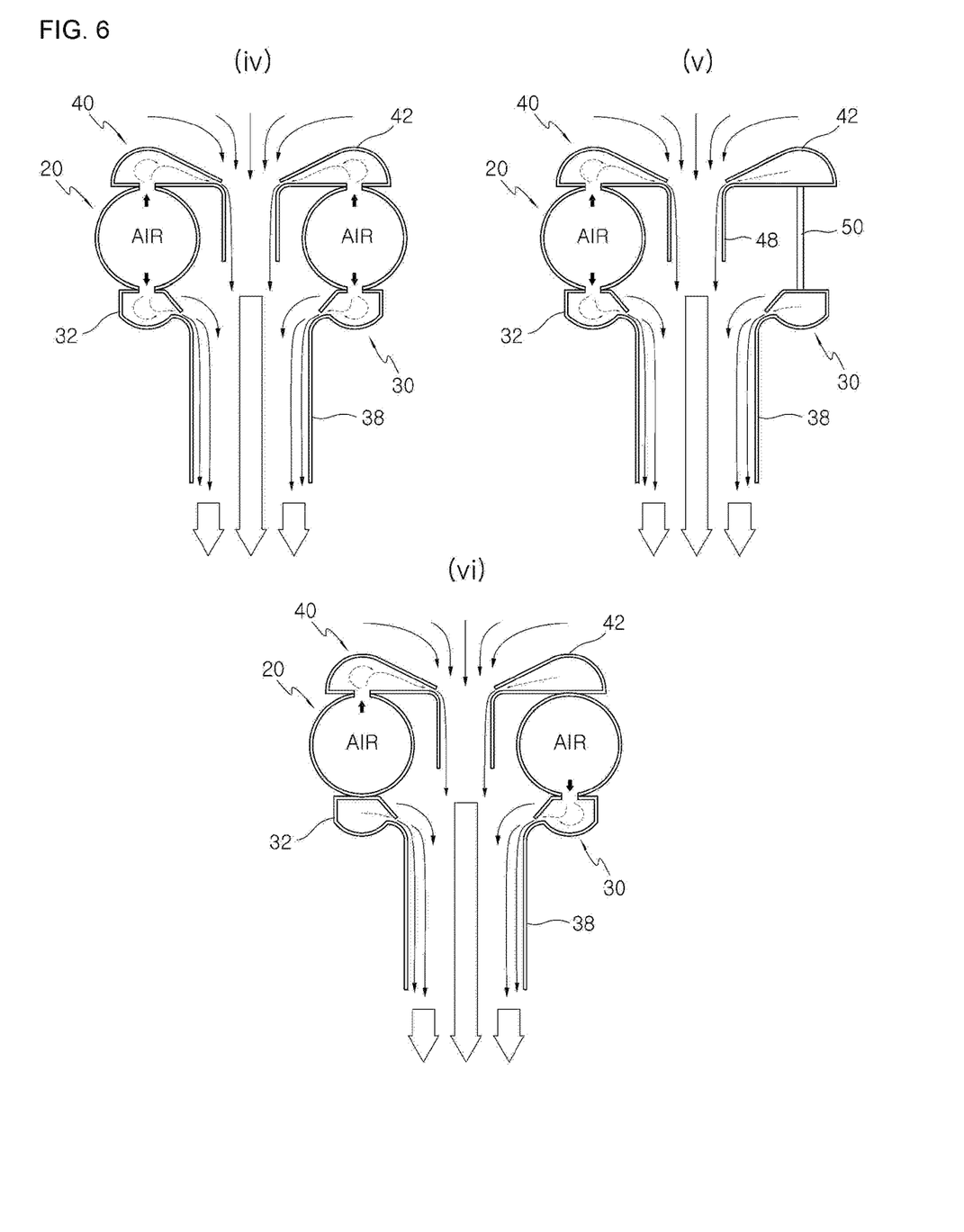

However, as shown in FIGS. 4(B), 5(ii) and 6(v), it is also possible to form a structure that the compressed air pipe 20 in which compressed air flows and a support member 50 in which compressed air does not flow are spaced apart from each other and are arranged horizontally side by side.

In this instance, the support member 50 is interposed between the body part 32 of the first injector 30 and the body part 42 of the second injector 40 to connect, fix and support the first injector 30 and the second injector 40.

One end of the compressed air pipe 20 is connected to the control valve 5 for supplying and blocking compressed air. When the compressed air pipe 20 diverges into two branch pipes 24 and 24' to be spaced apart from each other and arranged horizontally side by side, outlets 22 may be equally formed in the upper surface and the lower surface of two branch pipes 24 and 24' (see FIGS. 5(i) and 6(iv)), or may be formed only in the upper surface of one among the two branch pipes 24 and 24' and only in the lower surface of the other (see FIGS. 5(iii) and 6(vi)).

In order to cope with the positions of the outlets 22, a pair of connection holes 34 or one connection hole 34 may be formed in the body part 32 of the first injector 30 and a pair of connection holes 44 or one connection hole 44 may be formed in the body part 42 of the second injector 40.

The control valve 5 includes a control part and a valve. When a signal is inputted to the control part from the outside, the control part opens or closes the valve to supply or block the compressed air to or from the compressed air pipe 20.

Figure 7:
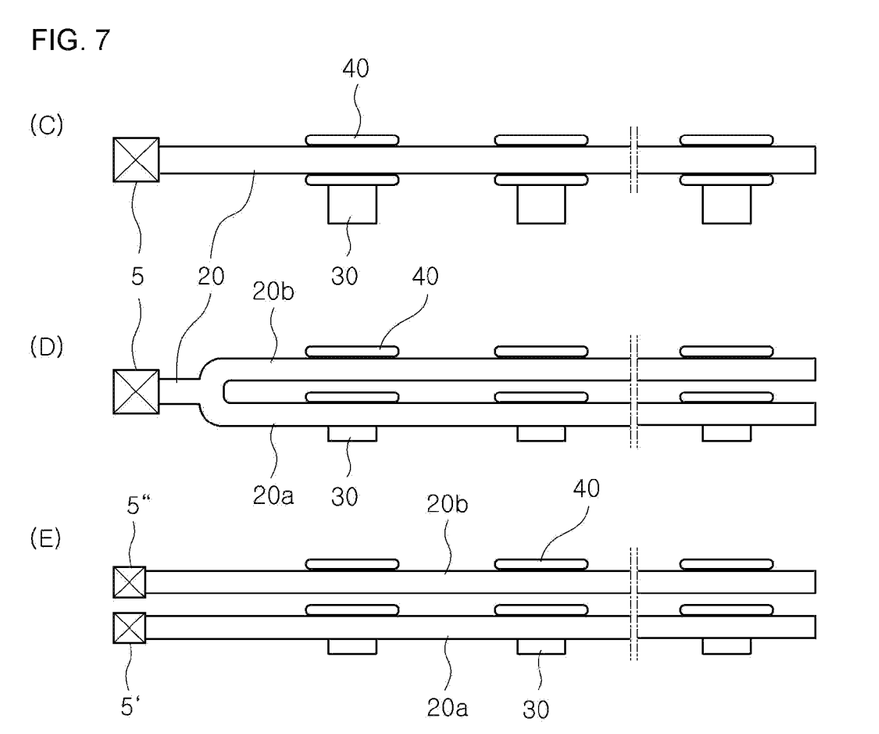
FIG. 7 is a side view illustrating the structure of the bag filter dust removing device according to the preferred embodiment of the present invention.

In another preferred embodiment of the present invention, as shown in FIGS. 7(D) and 7(E), the compressed air pipe 20 includes a first compressed air pipe 20a and a second compressed air pipe 20b, and the outlets 22 are formed in the upper surfaces of the first and second compressed air pipes 20a and 20b, and the outlets 22 of the first and second compressed air pipes 20a and 20b are connected with the connection holes 34 and 44 formed in the lower surfaces of the body parts 32 and 42 of the first and second injectors 30 and 40.

In this instance, the compressed air pipe 20 is connected to the control valve 5 for supplying and blocking the compressed air from the compressed air supply source 6 to the compressed air pipe, and diverges into upper and lower pipes, namely, into a first compressed air pipe 20a and a second compressed air pipe 20b (see FIG. 7(D)).

Alternatively, an end of the first compressed air pipe 20a and an end of the second compressed air pipe 20b may be respectively connected to a first control valve 5' and a second control valve 5'' which are spaced apart from each other to supply and block the compressed air from the compressed air supply source 6 to the first and second compressed air pipes 20a and 20b (see FIG. 7(E)).

Here, the first and second control valves 5' and 5'' may be turned on and off independently or simultaneously.

Moreover, the first and second compressed air pipes 20a and 20b may diverge into two branch pipes 24 and 24', which are arranged horizontally side by side to be spaced apart from each other, and the induction pipes 38 and 48 of the first and second injectors 30 and 40 may be arranged between the branch pipes 24 and 24' of the first and second compressed air pipes 20a and 20b (not shown).

Figure 8:
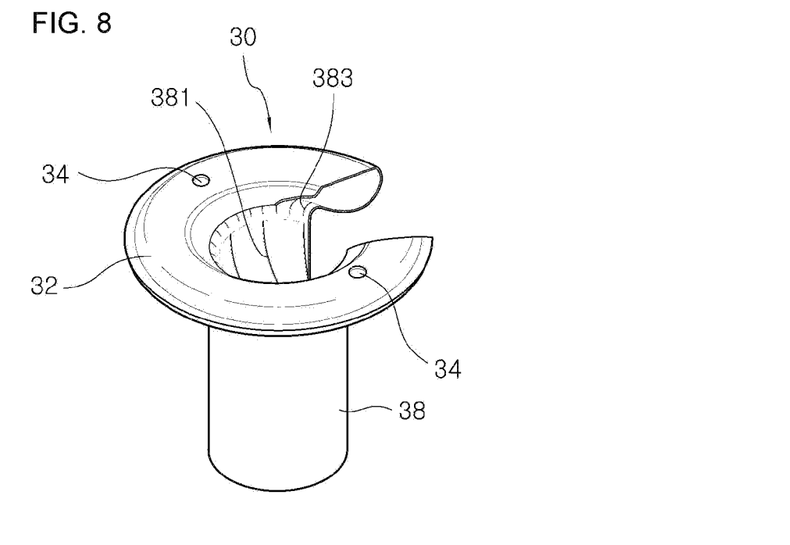
FIG. 8 is a partially perspective view in section, showing a structure of a first injector of the bag filter dust removing device according to the preferred embodiment of the present invention.

In a further preferred embodiment of the present invention, as shown in FIG. 8, the induction pipe 38 of the first injector 30 includes a spiral vortex forming part 381 disposed on the inner wall thereof and having a groove or a protrusion so that the amplified air can form a vortex when passing through the induction pipe 38.

The vortex forming part 381 changes the amplified air flowing along the inner wall of the induction pipe 38 at high speed into a vortex to cause vibration on the inner face of the bag filter 4, thereby enhancing the effect to remove dust attached onto the bag filter 4.

Furthermore, a plurality of compressed air inducing parts 383 having grooves or protrusions formed on the surface of the second guide 363 opposite to the first guide 361 or formed from the surface of the surface of the second guide 363 opposite to the first guide 361 to the Coanda face 365 may be formed in the direction of the central portion of the body part 32 from the second guide 363.

The compressed air inducing part 383 serves to guide a flow of the compressed air passing through the injection slit 36 in order to enhance injection speed of the compressed air more effectively.

FIG. 8 illustrates that the vortex forming part 381 and the compressed air inducing part 383 are disposed on the first injector 30, but of course, all or one of the vortex forming part 381 and the compressed air inducing part 383 may be formed on the second injector 40.

As described above, the dust removing device for the long bag filter having a large diameter according to the present invention employs the dual injector structure that the second injector for injecting amplified air into the first injector is arranged above the first injector for injecting amplified air on the same axis and is spaced apart from the first injector so as to generate air pulse with a wide and uniform range and an enhanced arrival distance. Therefore, the dust removing device for the long bag filter according to the present invention can show a strong dust removing force with respect to the bag filter having relatively larger diameter and longer length in comparison with the conventional bag filter dust removing devices.

Moreover, the dust removing device for a long bag filter having a large diameter according to the present invention can optimize space efficiency and reduce installation costs by reducing an installation area of the dust collector since reducing the number of the bag filters in a dust collector with the same capacity due to the long bag filter with the large diameter.

The invention claimed is:

1. A dust removing device for a bag filter having a diameter, which injects amplified air from an upper portion of a bag filter arranged inside a dust collector to remove dust collected on the bag filter, the dust removing device comprising:
    a compressed air pipe arranged horizontally and having a plurality of outlets formed to be spaced apart from each other to discharge compressed air, wherein the plurality of outlets comprises a first outlet and a second outlet;
    a first injector for amplifying the compressed air received from the compressed air pipe to inject the amplified air to the bag filter; and
    a second injector arranged above the first injector on the same axis to be spaced apart from the first injector and amplifying the compressed air received from the compressed air pipe to inject the amplified air into the center of the first injector, wherein the first injector includes a first doughnut-shaped body part having a first connection hole formed in an upper surface of the first doughnut-shaped body part, wherein the first connection hole is connected with the first outlet to receive the compressed air into the first doughnut-shaped body part; a first injection slit formed between a first guide and a second guide such that the first injection slit is formed in a circular shape along an inner circumferential surface of the first doughnut-shaped body part to inject the compressed air received through the first connection hole, wherein the first guide is formed at an upper side of the first doughnut-shaped body part and each of the second guide is formed at a lower side of the first doughnut-shaped body part; a first cylindrical induction pipe downwardly extending from the second guide to inject the amplified air containing ambient air vertically downwards when the compressed air is injected through the first injection slit; and a first curved Coanda face formed between the second guide and the first induction pipe; and wherein the second injector includes a second doughnut-shaped body part having a second connection hole formed in a lower surface of the second doughnut-shaped body part wherein the second connection hole is connected to the second outlet to receive the compressed air into the second doughnut-shaped body part; a second injection slit formed between a third guide and a fourth guide such that the second injection slit is formed in a circular shape along an inner circumferential surface of the second doughnut-shaped body part to inject the compressed air received through the second connection hole, wherein the third guide is formed at an upper side of the second doughnut-shaped body part and the fourth guide is formed at a lower side of the second doughnut-shaped body part; a second cylindrical induction pipe downwardly extending from the fourth guide to inject the amplified air containing ambient air vertically downwards when the compressed air is injected through the second injection slit and a second curved Coanda face formed between the fourth guide and the second induction pipe.

2. The dust removing device according to claim 1, wherein the ratio of the diameter of the first induction pipe to the diameter of the second induction pepe is 1: 0.3 to 0.7.

3. The dust removing device according to claim 1, wherein the compressed air pipe is arranged between the first doughnut-shaped body part and the second doughnut-shaped body part,
wherein the first outlet is formed in the lower surface of the compressed air pipe and the second outlet is formed in the upper surface of the compressed air pipe.

4. The dust removing device according to claim 3, wherein one end of the compressed air pipe is connected to a control valve for supplying and blocking compressed air from a compressed air supply source to the compressed air pipe, and the compressed air pipe diverges into two branch pipes arranged horizontally side by side to be spaced apart from each other, and
wherein the second induction pipe is arranged between the branch pipes.

5. The dust removing device according to claim 1,
wherein the compressed air pipe includes a first compressed air pipe and a second compressed air pipe,
wherein the first compressed air pipe comprises the first outlet and the second outlet,
wherein the second compressed air pipe comprises a third outlet and a fourth outlet,
wherein the third outlet is connected to a third connection hole in the first injector, and
wherein the fourth outlet is connected to a fourth connection hole in the second injector.

6. The dust removing device according to claim 5, wherein the compressed air pipe is connected to the control valve for supplying and blocking the compressed air from the compressed air supply source to the compressed air pipe.

7. The dust removing device according to claim 5, wherein an end of the first compressed air pipe and an end of the second compressed air pipe are respectively connected to a first control valve and a second control valve for supplying and blocking the compressed air from the compressed air supply source to the first and second compressed air pipes, wherein the first and second compressed air pipes are arranged horizontally side by side to be spaced apart from each other, and the first and second induction pipes are arranged between the first and second compressed air pipes.

8. The dust removing device according to claim 7, wherein the first and second control valves are turned on and off independently or simultaneously.

9. The dust removing device according to claim 1, wherein one or both of the first or second induction pipes includes a spiral vortex forming part disposed on the inner wall thereof, wherein the spiral vortex forming part comprises a groove or a protrusion so that the amplified air can form a vortex when passing through the induction pipe.

10. The dust removing device according to claim 1, wherein a plurality of compressed air inducing parts having grooves or protrusions formed on the surface of the second guide opposite to the first guide or formed from the surface of the second guide opposite to the first guide to the Coanda face are formed in the direction of the central portion of the first doughnut-shaped body part from the second guide.

* * * * *